(12) United States Patent
Eickhoff (10) Patent No.: US 8,043,736 B2
(45) Date of Patent: Oct. 25, 2011

(54) POWER GENERATOR HAVING MULTIPLE LAYERS OF FUEL CELLS

(75) Inventor: Steven J. Eickhoff, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1322 days.

(21) Appl. No.: 11/353,571

(22) Filed: Feb. 14, 2006

(65) Prior Publication Data

US 2007/0160887 A1    Jul. 12, 2007

Related U.S. Application Data

(60) Provisional application No. 60/757,823, filed on Jan. 10, 2006.

(51) Int. Cl.
*H01M 2/14* (2006.01)
*H01M 8/02* (2006.01)

(52) U.S. Cl. .......... 429/13; 429/408; 429/419; 429/416; 429/417; 429/421

(58) Field of Classification Search .................. None
See application file for complete search history.

(56) References Cited

U.S. PATENT DOCUMENTS

| | | |
|---|---|---|
| 3,649,360 A | 3/1972 | Bloomfield et al. |
| 4,155,712 A | 5/1979 | Taschek |
| 4,261,955 A | 4/1981 | Bailey, Jr. et al. |
| 4,614,204 A | 9/1986 | Dolejs |
| 5,346,777 A | 9/1994 | Namba et al. |
| 5,372,617 A | 12/1994 | Kerrebrock et al. |
| 5,458,989 A | 10/1995 | Dodge |
| 5,534,363 A | 7/1996 | Sprouse et al. |
| 5,549,983 A * | 8/1996 | Yamanis .................. 429/32 |
| 5,759,712 A | 6/1998 | Hockaday |
| 5,853,910 A | 12/1998 | Tomioka et al. |
| 5,914,200 A | 6/1999 | Schabert et al. |
| 6,057,051 A | 5/2000 | Uchida et al. |
| 6,093,501 A | 7/2000 | Werth |
| 6,179,986 B1 | 1/2001 | Swette et al. |
| 6,395,414 B1 | 5/2002 | Clingerman et al. |

(Continued)

FOREIGN PATENT DOCUMENTS

DE          10050554          4/2002

(Continued)

OTHER PUBLICATIONS

Epstein, Alan H., "Millimeter-Scale, MEMS Gas Turbine Engines", *Proceedings of ASME Turbo Expo 2003, Power for Land, Sea, and Air*, Jun. 16-19, 2003, Atlanta, Georgia, USA, (2003),1-28.

(Continued)

*Primary Examiner* — Ula C. Ruddock
*Assistant Examiner* — Alix Echelmeyer
(74) *Attorney, Agent, or Firm* — Schwegman, Lundberg & Woessner, P.A.

(57) ABSTRACT

A power generator has a hydrogen source, such as a hydrogen producing fuel and a fuel cell having a proton exchange membrane separating the hydrogen producing fuel from ambient. A valve is disposed between the fuel cell and ambient such that water is controllably prevented from entering or leaving the fuel cell by actuation of the valve. In one embodiment, multiple fuel cells are arranged in a circle around the fuel, and the valve is a rotatable ring shaped gate valve having multiple openings corresponding to the fuel cells.

15 Claims, 4 Drawing Sheets

U.S. PATENT DOCUMENTS

| | | | |
|---|---|---|---|
| 6,432,566 | B1 | 8/2002 | Condit et al. |
| 6,471,850 | B2 | 10/2002 | Shiepe et al. |
| 6,492,044 | B1 | 12/2002 | Walsh |
| 6,524,450 | B1 | 2/2003 | Hara |
| 6,558,832 | B1 | 5/2003 | Bruck et al. |
| 6,576,358 | B2 | 6/2003 | Gebhardt et al. |
| 6,582,842 | B1 | 6/2003 | King |
| 6,844,100 | B2 | 1/2005 | Bourgeois et al. |
| 6,866,806 | B2 | 3/2005 | Andrews et al. |
| 6,979,508 | B2 | 12/2005 | Gurin et al. |
| 7,393,369 | B2 * | 7/2008 | Shurtleff ............................ 48/61 |
| 7,727,647 | B2 | 6/2010 | Eickhoff et al. |
| 7,727,655 | B2 | 6/2010 | Eickhoff |
| 2002/0017463 | A1 | 2/2002 | Merida-Donis |
| 2002/0064698 | A1 | 5/2002 | Ren |
| 2002/0090868 | A1 | 7/2002 | Schmitman |
| 2002/0100682 | A1 | 8/2002 | Kelley et al. |
| 2002/0150804 | A1 | 10/2002 | Srinivasan et al. |
| 2002/0153263 | A1 | 10/2002 | Velev |
| 2002/0182459 | A1 | 12/2002 | Hockaday et al. |
| 2003/0085135 | A1 | 5/2003 | Andrews et al. |
| 2003/0091880 | A1 | 5/2003 | Joos et al. |
| 2003/0104267 | A1 | 6/2003 | Haridoss et al. |
| 2003/0150218 | A1 | 8/2003 | Ovshinsky et al. |
| 2003/0228252 | A1 | 12/2003 | Shurtleff |
| 2004/0009379 | A1 | 1/2004 | Amendola et al. |
| 2004/0052723 | A1 | 3/2004 | Jorgensen |
| 2004/0062978 | A1 | 4/2004 | Yazici |
| 2004/0086755 | A1 | 5/2004 | Kalal |
| 2004/0110044 | A1 | 6/2004 | McArthur et al. |
| 2004/0118677 | A1 | 6/2004 | Streckert et al. |
| 2004/0161646 | A1 | 8/2004 | Rezachek et al. |
| 2004/0202903 | A1 * | 10/2004 | deVos et al. ..................... 429/19 |
| 2005/0056042 | A1 | 3/2005 | Bourne et al. |
| 2005/0142424 | A1 * | 6/2005 | Homma et al. ................. 429/38 |
| 2005/0158595 | A1 | 7/2005 | Marsh et al. |
| 2005/0181245 | A1 | 8/2005 | Bonne et al. |
| 2005/0199546 | A1 | 9/2005 | Rusta-Sallehy et al. |
| 2005/0233181 | A1 | 10/2005 | Wariishi et al. |
| 2005/0249986 | A1 | 11/2005 | McLean |
| 2006/0045228 | A1 | 3/2006 | Shiao et al. |
| 2006/0066105 | A1 | 3/2006 | Johnson et al. |
| 2006/0076780 | A1 | 4/2006 | Johnson |
| 2006/0134487 | A1 | 6/2006 | Wang et al. |
| 2006/0185915 | A1 | 8/2006 | Kaneko |
| 2006/0210850 | A1 | 9/2006 | Abouatallah et al. |
| 2006/0234093 | A1 | 10/2006 | Schaefer et al. |
| 2006/0261349 | A1 | 11/2006 | Doering et al. |
| 2006/0292436 | A1 | 12/2006 | Cook et al. |
| 2007/0072042 | A1 | 3/2007 | Lam |
| 2007/0178340 | A1 | 8/2007 | Eickhoff |
| 2007/0184312 | A1 | 8/2007 | Eickhoff |
| 2007/0259227 | A1 | 11/2007 | Oishi et al. |
| 2007/0277870 | A1 | 12/2007 | Wechsler |
| 2007/0298312 | A1 | 12/2007 | Koehler et al. |
| 2008/0233462 | A1 | 9/2008 | Curello et al. |

FOREIGN PATENT DOCUMENTS

| | | | |
|---|---|---|---|
| DE | 10050554 | A1 | 4/2002 |
| EP | 1469545 | | 10/2004 |
| EP | 1469545 | A2 | 10/2004 |
| EP | 1601037 | A1 | 11/2005 |
| JP | 2003123778 | A | 4/2003 |
| JP | 2004247091 | | 8/2004 |
| JP | 04-247091 | | 9/2004 |
| JP | 2004-247091 | | 9/2004 |
| WO | WO-0109519 | | 2/2001 |
| WO | WO-0145189 | | 6/2001 |
| WO | WO-0145189 | A1 | 6/2001 |
| WO | WO-0109519 | A1 | 8/2001 |
| WO | WO-2004075375 | A2 | 9/2004 |
| WO | WO-2004093231 | | 10/2004 |
| WO | WO-2004093231 | A2 | 10/2004 |
| WO | WO-2005/004273 | A2 | 1/2005 |

OTHER PUBLICATIONS

Holmes, Andrew S., et al., "Axial-Flux Permanent Magnet Machines for Micropower Generation", *Journal of Microelectromechanical Systems*, vol. 14, No. 1., (2005),54-62.

Pasaogullari, Ugur , "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California,(Nov. 13-20, 2004),1-9.

"Application Serial No. 06826322.7, Office Action Received mailed Apr. 27, 2009", 4 pgs.

"Application Serial No. 06826323.5, Office Action Received mailed Jul. 21, 2009", 3 pgs.

"U.S. Appl. No. 11/257,738 , Restriction Requirement mailed Oct. 6, 2009", 6 Pgs.

"U.S. Appl. No. 11/257,738, Response to Restriction Requirements mailed Nov. 6, 2009", 6 pgs.

"U.S. Appl. No. 11/257,872, Non Final Office Action mailed Apr. 24, 2009", 18 pgs.

"U.S. Appl. No. 11/257,872, Response filed Jul. 24, 2009 to Non Final Office Action maield Apr. 24, 2009", 14 pgs.

"U.S. Appl. No. 11/343,657, Non-Final Office Action mailed 08-289", 19 Pgs.

"U.S. Appl. No. 11/343,657, Response filed Oct. 29, 2009 to Non Final Office Action mailed Jul. 31, 2009", 12 pgs.

"U.S. Appl. No. 11/351,175, Non-Final Office Action mailed Jul. 23, 2009", 10 pgs.

"U.S. Appl. No. 11/351,175, Response filed Oct. 21, 2009 to Non Final Office Action mailed Jul. 23, 2009", 11 pgs.

"U.S. Appl. No. 11/257,872, Final Office Action mailed Oct. 8, 2009", 20 Pgs.

"Chinese Application No. 200680048951.X, First Action mailed Sep. 4, 2009", (w/ English Translation), 14 pgs.

"European Application Serial No. 07717606.3, Office Action mailed Dec. 5, 2008", 3 pgs.

"European Application Serial No. 07717606.3, Response filed Jun. 2, 2009 to Communication mailed Dec. 5, 2008", 2 pgs.

"International Application Serial No. PCT/US2006/040984, International Search Report mailed Oct. 25, 2007", 6 pgs.

"International Application Serial No. PCT/US2006/040984, Written Opinion mailed Oct. 25, 2007", 12 pgs.

"International Application Serial No. PCT/US2007/062021, International Search Report mailed Sep. 4, 2007", 5 pgs.

"International Application Serial No. PCT/US2007/062021, Written Opinion mailed Sep. 4, 2007", 9 pgs.

"U.S. Appl. No. 11/257,738, Notice of Allowance mailed Jun. 1, 2010", 9 pages.

"U.S. Appl. No. 11/257,738, Notice of Allowance mailed Jun. 1, 2010", 8 pgs.

"U.S. Appl. No. 11/343,657, Non Final Office Action mailed May 14, 2010", 12 pgs.

"U.S. Appl. No. 11/351,175, Final Office Action mailed Apr. 30, 2010", 9 pgs.

"U.S. Appl. No. 11/343,657, Non-Final Office Action mailed May 14, 2010", 13 pgs.

"Application No. 200680048771.1, Office Action mailed Aug. 28, 2009", 2 pgs.

"U.S. Appl. No. 11/351,175 Response filed Jan. 13, 2010 to Restriction mailed :", 6 pgs.

"Application Serial No. 06826322.7, Response filed Oct. 27, 2009 to Communication mailed Apr. 27, 2009", 2 pgs.

"U.S. Appl. No. 11/257,738, Non-Final Office Action mailed Dec. 9, 2009", 13.

"U.S. Appl. No. 11/257,738, Response filed Mar. 9, 2010 to Non Final Office Action mailed Dec. 9, 2009", 7 pgs.

"U.S. Appl. No. 11/257,872, Notice of Allowance mailed Jan. 20, 2010", 7 pgs.

"U.S. Appl. No. 11/257,872, Response filed Nov. 24, 2009 to Final Office Action mailed Oct. 8, 2009", 14 pgs.

"U.S. Appl. No. 11/343,657, Examiner Interview Summary filed Oct. 29, 2009", 1 pg.

"U.S. Appl. No. 11/343,657, Examiner Interview Summary mailed Jul. 31, 2009", 1 pg.

"U.S. Appl. No. 11/343,657, Final Office Action mailed Jan. 6, 2010", 13 pgs.

"U.S. Appl. No. 11/343,657, Response filed Mar. 3, 2010 to Final Office Action mailed Jan. 6, 2010", 10 pgs.

"U.S. Appl. No. 11/343,657, Response filed Mar. 22, 2010 to Advisory Action mailed Jan. 6, 2010", 9 pgs.

"U.S. Appl. No. 11/343,657 Advisory Action", 5 pgs.

"U.S. Appl. No. 11/351,175, Restriction Requirement mailed Jan. 6, 2010", 07.

"U.S. Appl. No. 11/351,175, Restriction Requirement mailed Jan. 6, 2010", 7 pgs.

"European Application Serial No. 06786891.9, Office Action mailed Feb. 25, 2010", 2 pgs.

"European Application Serial No. EP06826323.5, Response filed Nov. 26, 2009 to Office Action dated Jul. 21, 2009", 10 pgs.

"U.S. Appl. No. 11/351,175, Final Office Action mailed Feb. 11, 2011", 8 pgs.

"U.S. Appl. No. 11/351,175, Response filed Nov. 29, 2010 to Non Final Office Action mailed Aug. 27, 2010", 8 pgs.

"Chinese Application Serial No. 200680048951.X, Office Action mailed Sep. 26, 2010", 3 pgs.

"Chinese Application Serial No. 200780012846.5, Office Action mailed Oct. 21, 2010", (w/ English Translation), 16 pgs.

"Chinese Application Serial No. 200780012846.5, Response filed Dec. 7, 2010 to Office Action dated Oct. 21, 2010", (w/ English Translation of Amended Claims), 7 pgs.

"European Application Serial No. 06826322, Response filed Feb. 16, 2011 to Office Action dated Nov. 4, 2010", 8 pgs.

"European Application Serial No. 06826322.7, Office Action mailed Nov. 4, 2010", 4 pgs.

"U.S. Appl. No. 11/257,738, Notice of Allowance mailed Jun. 1, 2010", 8 pgs.

"U.S. Appl. No. 11/351,175, Response filed Jun. 30, 2010 to Final Office Action mailed Apr. 30, 2010", 7 pgs.

"U.S. Appl. No. 11/343,657, Response filed Aug. 5, 2010 to Non Final Office Action mailed May 14, 2010", 10 pgs.

"U.S. Appl. No. 11/351,175, Non-Final Office Action mailed Aug. 27, 2010", 8 pgs.

"Chinese Application Serial No. 200680048951.X, Response filed Aug. 20, 2010 to Office Action dated Jun. 9, 2010", (w/ English Translation of Amended Claims), 24 pgs.

"European Application Serial No. 06786891.9, Response filed Jun. 23, 2010 to Office Action mailed Feb. 25, 2010", 7 pgs.

"Chinese Application No. 200680048771.1, Response filed Jan. 12, 2010 to Office Action dated Aug. 28, 2009", (w/ English Translation), 10 pgs.

"Chinese Application No. 20070012846.5, Response filed Jun. 9, 2011", (w/ English Translation of Amended Claims), 10 pgs.

"U.S. Appl. No. 11/451,165, Amendment and Response filed Apr. 22, 2009 to Non-Final Office Action mailed Jan. 22, 2009", 11 pgs.

"U.S. Appl. No. 11/451,165, Amendment and Response filed Oct. 16, 2009 to Non-Final Office Action mailed Jul. 16, 2009", 10 pgs.

"U.S. Appl. No. 11/451,165, Amendment and Response filed Oct. 29, 2008 to Non-Final Office Action mailed Jul. 29, 2008", 10 pgs.

"U.S. Appl. No. 11/451,165, Non-Final Office Action mailed Jan. 22, 2009", 13 pgs.

"U.S. Appl. No. 11/451,165, Non-Final Office Action mailed Jul. 16, 2009", 14 pgs.

"U.S. Appl. No. 11/451,165, Non-Final Office Action mailed Jul. 29, 2008", 9 pgs.

"U.S. Appl. No. 11/451,165, Notice of Allowance mailed Jan. 14, 2010", 8 pgs.

"U.S. Appl. No. 11/451,165, Preliminary Amendment mailed Jul. 11, 2006", 7 pgs.

"Chinese Application Serial No. 200680033217.6, Response filed Aug. 30, 2010 to Office Action mailed Apr. 15, 2010", 8 pgs.

"Chinese Application Serial No. 200780012846.5, Response filed Sep. 6, 2010 to Office Action mailed Apr. 27, 2010", (w/ English Translation of Pending Claims), 8 pgs.

"International Application Serial No. PCT/US2006/040983, International Search Report mailed Mar. 9, 2007", 3 pgs.

"International Application Serial No. PCT/US2006/040983, Written Opinion mailed Mar. 9, 2007", 7 pgs.

"U.S. Appl. No. 11/343,657, Final Office Action mailed Apr. 6, 2011", 14 pgs.

"U.S. Appl. No. 11/351,175, Response filed May 3, 2011 to Final Office Action mailed Feb. 11, 2011", 8 pgs.

"Capstone Micro Turbine™ Product Sheet", [online]. *Capstone Turbine Corporation*, Retrieved from the Internet <URL: http://www.enedis.com.ar/documents/es/gendis_esp_60_C.pdf>, (2010), 2 pgs.

"Chinese Application Serial No.200780012846.5, Office Action mailed Apr. 8, 2011", (w/English Translation), 22 pgs.

"Microturbine", The Encyclopedia of Alternative Energy and Sustainable Living, [Online]. [retrieved Oct. 27, 2010]. Retrieved from the Internet: <URL:http://www.daviddarling.info/encyclopedia/M/AE_microturbine.html>, (2007), 2 pgs.

"Military Microturbine-powered Portable Devices", [Online]. [retrieved Oct. 27, 2010]. Retrieved from the Internet: <URL:http//www.growthconsulting.frost.com/web/images.nsf/0/9A7A06C4980C1AB5652573AE002F1765/$File/TI%20Alert.htm 2010>, (2010), 2 pgs.

Decuypere, I.R., et al., "Micro Turbines from the Standpoint of Potential Users", *In: Micro Gas Turbines, RTO-EN-AVT-131, Paper 15*, (2005), pp. 15-1-15-14.

"U.S. Appl. No. 11/343,657, Non Final Office Action mailed Jul. 27, 2011", 14 pgs.

"U.S. Appl. No. 11/343,657, Response filed Jun. 22, 2011 to Final Office Action mailed Apr. 6, 2011", 9 pgs.

"U.S. Appl. No. 11/351,175, Notice of Allowance mailed Aug. 8, 2011", 7 pgs.

"Chinese Application Serial No. 200680048771.1, Second Office Action mailed Jun. 14, 2011", (w/ English Translation), 8 pgs.

"Chinese Application Serial No. 200780012846.5, Office Action mailed Jul. 5, 2011", (w/ English Translation), 11 pgs.

"Chinese Application Serial No. 200780012846.5, Response filed Aug. 16, 2011 to Office Action mailed Jul. 5, 2011", (w/ English Translation of Claims), 9 pgs.

* cited by examiner

POWER GENERATOR HAVING MULTIPLE LAYERS OF FUEL CELLS

CROSS-REFERENCE TO RELATED APPLICATIONS

This application claims the benefit of U.S. Provisional Patent Application Ser. No. 60/757,823, filed Jan. 10, 2006, under 35 U.S.C. §119(e). The specification of which is incorporated herein by reference.

BACKGROUND

In some fuel cell based power generators, hydrogen is extracted from a fuel in the presence of water and then is introduced into a fuel cell to produce electricity. Power generators based on hydrogen generators and proton exchange membrane (PEM) fuel cells typically offer a narrow range of power outputs over which the power generator operates efficiently. Changing the power output of a power generator usually requires a redesign of the power generator, which is undesirable.

SUMMARY

A power generator has a hydrogen source, such as a hydrogen producing fuel and a multiple layer fuel cell configuration. The multiple layers or stack of fuel cells provides a power generator that is easily modified to produce a wide range of power outputs without redesign.

In one embodiment, each fuel cell in a layer has a proton exchange membrane separating the hydrogen producing fuel from ambient. The layers are arranged in such a manner that ambient, which is a source of oxygen is provided on a cathode side of the membrane, and hydrogen produced from the hydrogen producing fuel is available on the anode side of the proton exchange membrane. Fuel cells may be electrically coupled in series and/or parallel to provide a desired voltage/current. The power generator is designed such that an additional layer or layers may be easily added in series or parallel to increase power output.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

An electrical power generator is provided which generates hydrogen gas internally through the reaction of water vapor with a moisture absorbing, solid fuel substance. The hydrogen gas is reacted with oxygen at a fuel cell, such as a fuel cell containing a proton exchange membrane, to generate electrical energy. The reaction of hydrogen and oxygen also produces water molecules as a byproduct at the fuel cell. This generated water may be passively diffused from the fuel cell as water vapor to a fuel chamber that contains the solid fuel substance, where it reacts with the fuel substance to generate hydrogen gas. The electrical energy generated may be used to power large or small devices that are connected to the power generator, depending on the size of the power generator.

The power generator may be useful for powering miniature devices such as wireless sensors, cellular phones or other handheld electronic devices that are electrically connected to the anode and cathode of the one or more fuel cells of the power generator. Multiple layers of fuel cells may be supported by a structure that provides access of the fuel cells to oxygen, such as from ambient and hydrogen for generation of power.

A single power generator design may accommodate a wide variety of power levels simply by stacking a desired number of fuel cell layers. The fuel cells in each layer may be connected in series, and the layers connected in parallel (to give more current). If, for example, one layer of fuel cells may provide a 10 mW power generator. If 20 mW were required, two layers may be used, and so on. The electrical and gas connections may be made through a central column in the stack of fuel cells. The fuel cells and layers may be electrically coupled in series and/or parallel as desired to provide higher or lower voltages and currents. Layers may be added to increase power output, or removed to decrease power output.

Figure 1:
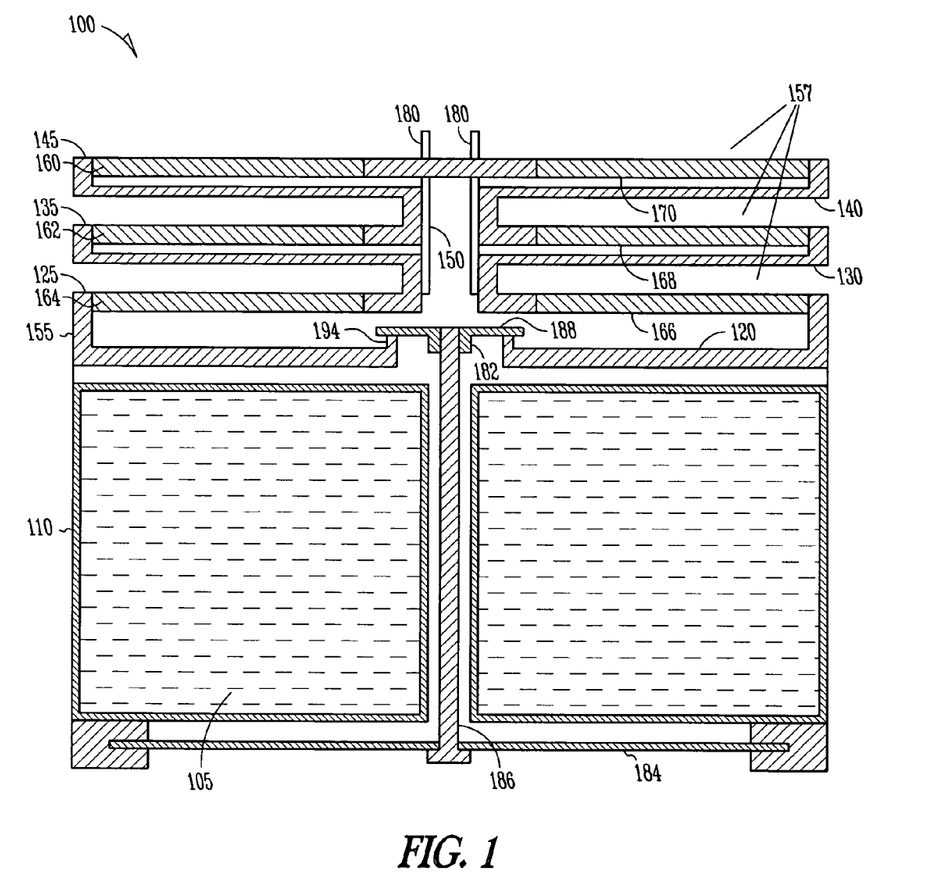
FIG. 1 is a cross sectional view of a cylindrical power generator having multiple layers of fuel cells according to an example embodiment.

FIG. 1 is a cross sectional view of a multiple layer stacked power generator 100. Power generator 100 contains a hydrogen producing fuel 105 in a container 110. A support structure 115 is coupled to the container and contains a plurality of plates 120, 125, 130, 135, 140 and 145 in a stacked relationship in one embodiment. The plates are coupled together via an inside column 150 and via an outside ring structure 155. This coupling provides an accordion like cross section, and allows ambient 157 to flow to cathode sides of multiple fuel cells in multiple layers indicated at 160, 162 and 164. The inside column 150 allows hydrogen generated from fuel 105 to flow to anode sides of the multiple fuel cells in multiple layers as indicated at 166, 168 and 170. Electrodes 180 are also shown coupling the multiple layers together to provide desired power levels. The electrodes may also be disposed within the inside column 150 in one embodiment, or located elsewhere in further embodiments.

Each of the assembled component parts of the power generator 100 may further be enclosed in a suitable hollow structure such as a tube formed from a suitable material, such as polyethylene terephthalate (not shown), which enclosure may also be capped on the top and/or bottom surfaces with a suitable cap (not shown), which cap may be removable and may be formed of a similar or different material as the enclosure.

In one embodiment, as shown, three levels of fuel cells are provided. For example, if each layer provided 10 mW of power, the power generator provides 30 mW of power. Layers may provide different power levels depending on design and size. Additional layers of plates with corresponding fuel cells may be added to increase the power output, or fewer layers may be used to decrease the power output. The power generator is easily configured to meet the requirements of different devices it may be used to power without having to redesign the power generator. In further embodiments, multiple layers of fuel cells may be provided, but only a desired number of layers need be electrically connected. This would allow the same power generator to be configured to provide different power output levels.

Support structure 115 is electrically isolated from the fuel cells in one embodiment. It may be constructed of PET, or steel, or other materials that provide sufficient support.

In one embodiment, the outside ring structure 155 may have holes or openings corresponding to passages or channels between plates or support structure 115 to allow passage of ambient air to the cathodes. It may also be completely open as indicated, or simply have pillars or other supporting structures to provide mechanical stability as desired. The inside column 150 may be similarly constructed to allow access of the anodes to hydrogen.

Plates 125, 135 and 145 provide support structures for supporting the fuel cells. As indicated above, each fuel cell has a cathode and an electrode. The plates also ensure that each side of the fuel cell is exposed to the proper medium, such as ambient for cathode sides and hydrogen for anode sides of the fuel cells. Plates 120, 130 and 135, which alternate with the support plates, serve as a barrier to ambient for the anodes, and also provide a path or channel from ambient to the cathodes.

In one embodiment, a pressure regulated valve 182 is disposed between the hydrogen producing fuel and the fuel cells. The valve consists of a pressure responsive flexible diaphragm 184 disposed on a first side of the hydrogen producing fuel, and a piston or stem 186 connecting a plate valve 188 for seating on a plate 120 of the support structure. Plate 120 may have an annular seat ring 190 for making a sealing contact with the plate valve 188.

In the embodiment shown, the diaphragm is opposite the fuel cells from the fuel. In further embodiments, the diaphragm may be positioned on the same side, or in various different places on the power generator as desired. The diaphragm operates in a manner similar to the above described embodiments. The fuel 805 may also be constructed in a manner similar to the above described embodiments.

In a further embodiment, a rotating ring gate valve may be placed between plates, such as plates 125 and 137 to selectively close off fuel cells supported in plate 125 from ambient. Other layers in the fuel cell may continue to operate normally. In a further embodiment, a ring gate valve may be placed to close off ambient from all fuel cells as desired. An additional plate above plate 145 may be used to support such a ring gate with respect to the fuel cells supported in plate 145.

Each of the parts of the power generator 100 may be fabricated of a suitable polymeric material, a metal or other material as determined by the requirements of the intended use of the generator. One example material non-exclusively includes polyethylene terephthalate. Dimensions of the component parts of the power generator 100 may be very small in scale, but may also vary with respect to the use of the power generator 100. Outer dimensions of such a waterless, micro-power generator may range from about 1 mm to about 100 mm in length, from about 1 mm to about 100 mm in width, and from about 1 to about 100 mm in depth, or in a further embodiment, from about 1 mm to about 25 mm in length, or long if more cells are stacked. In further embodiments, the power generator may range from about 1 mm to about 25 mm in width, and from about 1 to about 25 mm in depth. These dimensions are meant merely to be examples, and as limitations, as further embodiments may be much larger or smaller.

Figure 2:
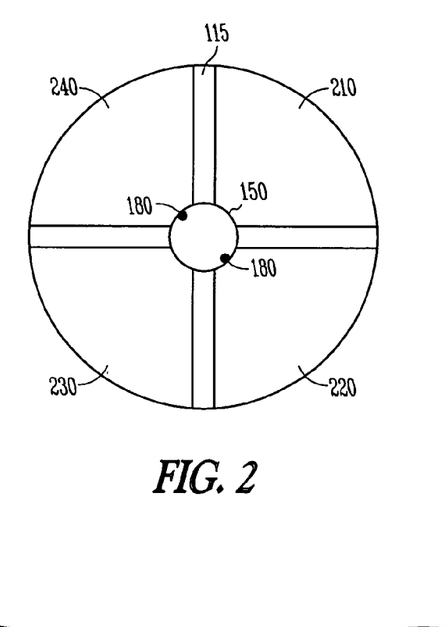
FIG. 2 is a block schematic diagram of fuel cells in a layer according to an example embodiment.

FIG. 2 is a block schematic diagram of fuel cells in one layer according to an example embodiment. Each layer may have a different fuel cell layout as desired, or the same layout. In one embodiment, the shape of the fuel cells is designed to optimize the utilization of surface are of the layer. As shown in FIG. 2, four fuel cells, 210, 220, 230 and 240 are pie shaped, and are supported by portions of support structure 115. The inside column 150 is shown at the center of the layer. Electrical connections to various layers may be made through the inside column 150 in one embodiment. In further embodiments, more or fewer fuel cells of various shapes and sizes may be utilized. Other shapes include but are not limited to rectangles, squares, circles, triangles, etc. The pie shape shown may provide a higher power density by maximizing the surface area available within a fixed diameter power generator container.

Figure 3A:
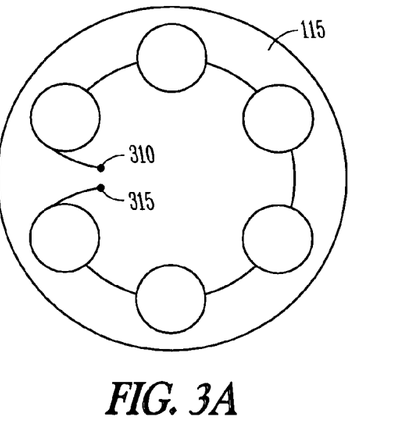
FIGS. 3A and 3B are electrical schematic diagrams illustrating various electrical connections between fuel cells in a layer according to an example embodiment.
Figure 3B:
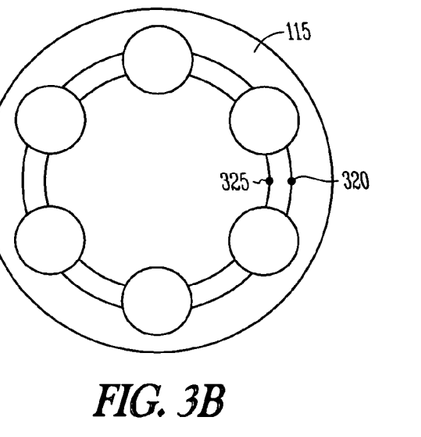

FIGS. 3A and 3B are electrical schematic diagrams illustrating various electrical connections between fuel cells in a layer according to an example embodiment. FIG. 3A illustrates a series connection between six fuel cells in a layer. The cells are coupled anode to cathode within the layer, with the anode and cathode of one set of adjacent fuel cells providing contacts 310, 315 for coupling with fuel cells in further layers and to an external load. FIG. 3B illustrates a parallel connection between six fuel cells in a layer. Each of the cathodes may be connected to each other with a contact 320, and each of the anodes may be connected to each other with a contact 325. Contacts 320 and 325 serve as connection points to other layers, and to an external load.

Figure 4A:
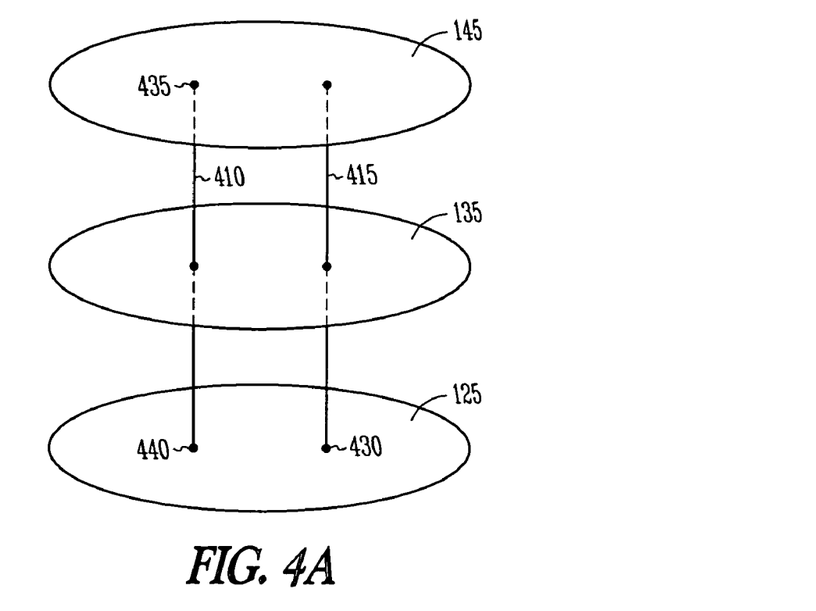
FIGS. 4A and 4B are electrical schematic diagrams illustrating various electrical connections between layers according to an example embodiment.
Figure 4B:
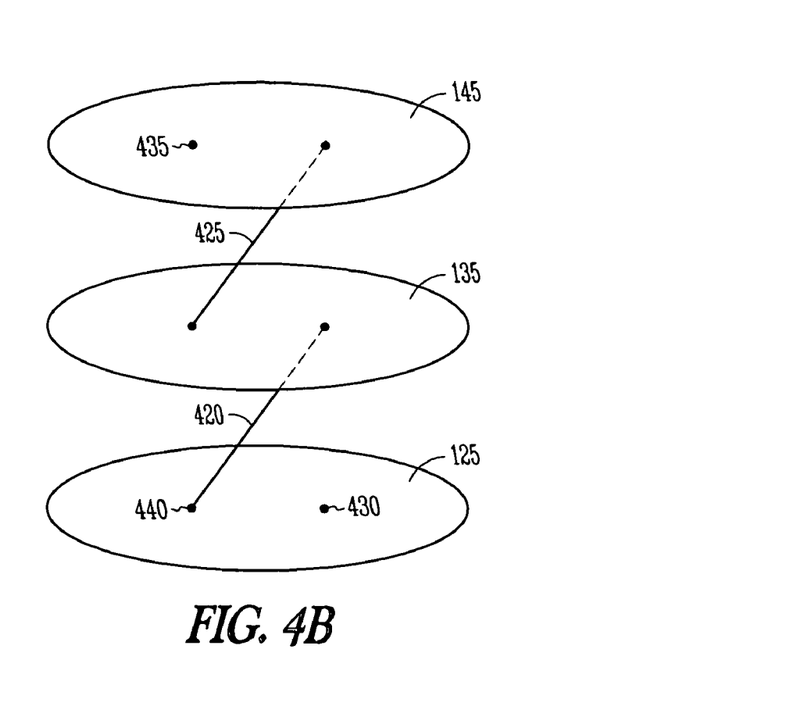

FIGS. 4A and 4B are electrical schematic diagrams illustrating various electrical connections between layers according to an example embodiment. FIG. 4A illustrates a parallel connection between three layers. Conductor 410 is coupled to an anode in each of layers 125, 135 and 145, while conductor 415 is coupled to a cathode in each of layers 125, 135 and 145. FIG. 4B illustrates a series connection between three layers in a power generator. An anode of layer 125 is coupled to a cathode of layer 135 via a connector 420. An anode of layer 135 is coupled to a cathode of layer 145 via a connector 425. Anode 435 of layer 135 and cathode 440 of layer 125 may be connected to a load. In further embodiments, connectors 420 and 425 may connect different electrodes of the layers as desired. Either method of connecting the layers may be mixed with different methods of connecting the cells in a layer, providing a broad range of voltage and current options. Further layers may also be added for increased power. Fewer layers may also be used, or layers may be left unconnected to reduce power.

In further embodiments, the size of the layers and power generator in general may be modified to obtain a broad range of powers. Further layers may be added to increase power levels if desired. Selected fuel cells may be coupled to uncoupled in further embodiments if desired.

In one embodiment, the power provided by a single fuel cell is proportional to the area of the fuel cell proton exchange membrane. The voltage produced by the fuel cell is approximately 0.95 volts, and may drop when a load draws current from the fuel cell. A typical operating range for a fuel cell is between 0.6 and 0.65 volts. Connecting several cells in parallel may tend to result in a higher operating voltage for a given current draw. Similarly, to increase the voltage of a set of cells, they may be connected in series. To maintain a higher voltage under load, a set of cells, such as all cells in a layer may be coupled in series, while the different layers may be connected in parallel. These are just a few examples of configurations that may be achieved by modifying electrical connections without changing the fundamental design of the power generator. By electrically coupling fuel cells within a layer in series and/or parallel and electrically coupling layers in series and/or parallel, desired electrical characteristics such as voltage and/or current may be obtained.

Figure 5:
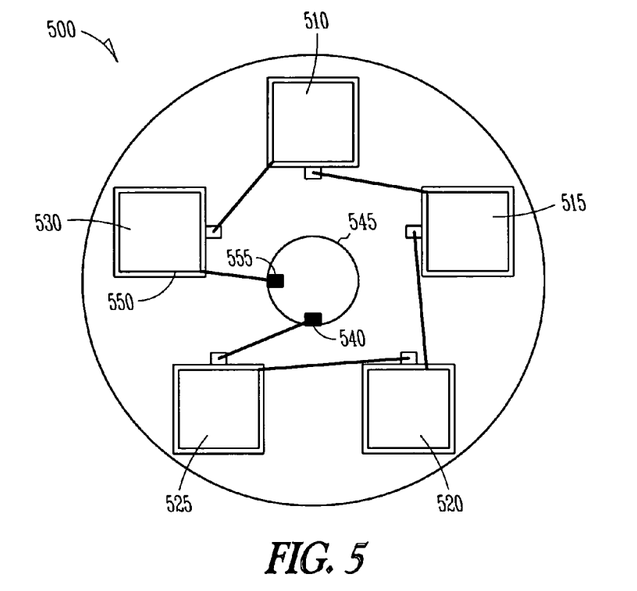
FIG. 5 is a block schematic diagram of fuel cells in a layer according to a further example embodiment.

FIG. 5 is a block schematic diagram of fuel cells in a layer 500 according to a further example embodiment. In this embodiment, five fuel cells, 510, 515, 520, 525 and 530 are coupled in series. A cathode of each fuel cell is coupled to an anode of an adjacent fuel cell, with the cathode 535 of fuel cell 525 electrically coupled to an access contact point 540 in a central column 545. An anode 550 of fuel cell 530 is coupled to an access contact point 555 in central column 545. The access points of various layers in a stacked layer power generator may be easily coupled via the central column 545, which also provides hydrogen to the fuel cells.

Figure 6:
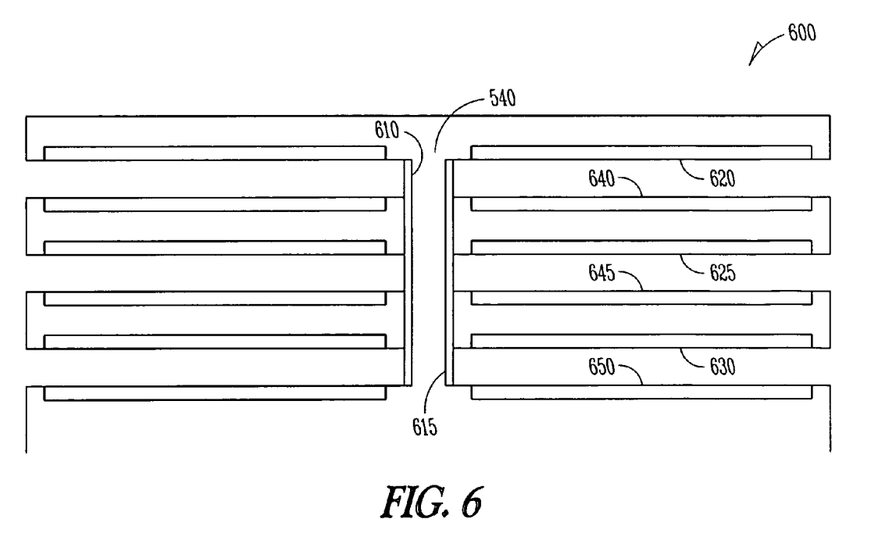
FIG. 6 is a cross section view of a fuel cell stack of layers illustrating electrical connection and the use of water vapor permeable hydrogen impermeable membranes according to an example embodiment.

FIG. 6 is a cross section view of a fuel cell stack 600 illustrating electrical connections 610, 615 to various layers of fuel cells through a column 540, and the use of water vapor permeable hydrogen impermeable membranes 620, 625 and 630 according to an example embodiment. The water vapor permeable hydrogen impermeable membranes 620, 625 and 630 may be Nafion® membranes in one embodiment. They may be set opposite the fuel cells 640, 645 and 650 in one embodiment, and may be used to reclaim water produced by the fuel cells. In this configuration, the fuel cells may operate at significantly higher current density because they don't need to serve a dual purpose of generating electricity and reclaiming the water. Column 540 may be a central column, and may serve as a conduit for electrical conductors that may be used to electrically couple various layers of fuel cells in a desired manner, such as in series or in parallel.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A power generator comprising:
a hydrogen source;
a multiple layer stack of fuel cells, each fuel cell having a cathode, proton exchange membrane, and anode positioned between the hydrogen source and ambient;
a central column, in electrical and fluidic contact with each of the layers of the fuel cells;
wherein each layer of fuel cells is removable and each layer of fuel cells is electrically configurable to provide varying power output levels;
a support structure that is electrically isolated from the fuel cells wherein the support structure connects multiple accordion shaped plates with fuel cells disposed in alternate plates and serves as a conduit for electrical conductors that connect fuel cells from different plates; and
wherein alternate plates not containing fuel cells comprise water vapor permeable hydrogen impermeable membranes that are exposed to ambient on one side and hydrogen on the other side.

2. The power generator of claim 1 wherein each layer of the stack comprises multiple fuel cells.

3. The power generator of claim 1 and further comprising a water vapor permeable hydrogen impermeable membrane exposed to ambient.

4. The power generator of claim 1 wherein fuel cells within a layer are electrically coupled in series or parallel.

5. The power generator of claim 1 wherein the layers are electrically coupled in series or parallel via the central column.

6. The power generator of claim 1 and further comprising: a pressure regulated valve disposed between the hydrogen source and the fuel cells, wherein the pressure regulated valve comprises a pressure responsive flexible diaphragm disposed on a first side of the hydrogen producing fuel, and a piston connecting a plate valve for seating on a first plate of the support structure.

7. The power generator of claim 6 wherein the pressure regulated valve is seated on the first plate when pressure between the hydrogen source and fuel cell is above a predetermined level.

8. The power generator of claim 7 wherein the pressure regulated valve allows exposure of the hydrogen source to the fuel cells when pressure between the hydrogen source and fuel cell is below a predetermined level.

9. The power generator of claim 1 wherein each layer of fuel cells comprises multiple fuel cells arranged in a circle, the power generator further comprising a multi-opening gate valve positioned to controllably provide access of a layer of fuel cell cathodes to ambient.

10. The power generator of claim 1 wherein the column is a central column.

11. The power generator of claim 1 wherein fuel cells within a layer are electrically coupled in series or parallel.

12. The power generator of claim 1 wherein layers of fuel cells are electrically coupled in series or parallel.

13. A method of electrically configuring fuel cells in a multiple fuel cell layer power generator to provide different power outputs, the method comprising:
electrically coupling fuel cells within a layer in series and/or parallel; and
electrically coupling layers in series and/or parallel to obtain varying power output levels;
wherein the power generator includes;
a hydrogen source, containing a hydrogen producing fuel in a container;
a support structure coupled to the container and containing a plurality of plates forming a multiple layer stack of fuel cells, wherein the plates are coupled together via an inside column and via an outside ring structure, to provide an accordion shaped cross section with alternate fuel cells and water permeable membranes;
each fuel cell having a cathode, proton exchange membrane, and anode positioned between the hydrogen source and ambient;
the inside column, in electrical and fluidic contact with each of the layers of fuel cells and configured to provide hydrogen from the hydrogen source to the layers of fuel cells, and to return water vapor generated by the fuel cells to the hydrogen source;
wherein each layer of fuel cells is removable and each layer of fuel cells is electrically configurable to provide varying power output levels.

14. A power generator comprising:
a hydrogen source, containing a hydrogen producing fuel in a container;
a support structure coupled to the container and containing a plurality of plates in a stacked relationship; wherein the plates are coupled together via an inside column and via an outside ring structure, to provide an accordion shaped cross section with alternate fuel cells and water permeable membranes;

wherein the support structure and ring structure allow ambient to flow radially inward to each layer of the cathode sides of multiple fuel cells in multiple layers, and the inside column allows hydrogen generated from the hydrogen fuel to flow radially outward to the anode sides of the multiple fuel cells in multiple layers, and also provides a path for water vapor generated from the fuel cells to return to the hydrogen source.

15. A power generator comprising:

a hydrogen source, containing a hydrogen producing fuel in a container;

a support structure coupled to the container and containing a plurality of plates in a stacked relationship; wherein the plates are coupled together via an inside column and via an outside ring structure, to provide an accordion shaped cross section with alternate fuel cells and water permeable membranes;

wherein the support structure and ring structure allow ambient to flow radially inward to each layer of the cathode sides of multiple fuel cells in multiple layers, and the inside column allows hydrogen generated from the hydrogen fuel to flow radially outward to the anode sides of the multiple fuel cells in multiple layers, and also provides a path for water vapor generated from the fuel cells to return to the hydrogen source;

a pressure regulated valve disposed between the hydrogen producing fuel and the fuel cells;

wherein each layer of fuel cells is removable and each layer of fuel cells is electrically configurable to provide varying power output levels.

* * * * *